United States Patent
Lee et al.

(10) Patent No.: US 11,579,342 B2
(45) Date of Patent: Feb. 14, 2023

(54) LIQUID LENS, CAMERA MODULE, AND OPTICAL DEVICE

(71) Applicant: LG INNOTEK CO., LTD., Seoul (KR)

(72) Inventors: Ba Ro Lee, Seoul (KR); Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 375 days.

(21) Appl. No.: 16/488,493

(22) PCT Filed: Feb. 23, 2018

(86) PCT No.: PCT/KR2018/002236
§ 371 (c)(1),
(2) Date: Aug. 23, 2019

(87) PCT Pub. No.: WO2018/155945
PCT Pub. Date: Aug. 30, 2018

(65) Prior Publication Data
US 2020/0049863 A1    Feb. 13, 2020

(30) Foreign Application Priority Data
Feb. 24, 2017  (KR) .................. 10-2017-0024717

(51) Int. Cl.
*G02B 3/14*    (2006.01)
*G02B 27/64*   (2006.01)
(Continued)

(52) U.S. Cl.
CPC ............. *G02B 3/14* (2013.01); *G02B 27/646* (2013.01); *G03B 3/10* (2013.01); *H04N 5/2254* (2013.01); *H04N 5/23248* (2013.01)

(58) Field of Classification Search
CPC .......... G02B 3/12; G02B 3/14; G02B 3/0081; G02B 26/004; G02B 26/005;
(Continued)

(56) References Cited

U.S. PATENT DOCUMENTS

2004/0174610 A1   9/2004 Aizenberg et al.
2012/0026596 A1   2/2012 Berge et al.
(Continued)

FOREIGN PATENT DOCUMENTS

CN    102385077 A     3/2012
CN    105158827 A  *  12/2015
(Continued)

OTHER PUBLICATIONS

Berry et al. "Reversible Electrowetting on Dual-Scale-Patterned Corrugated Microstructured Surfaces", IEEE, Journal of Microelectromechanical Systems, vol. 21, No. 5, Oct. 2012 pp. 1261-1271 (Year: 2012).*

*Primary Examiner* — Marin Pichler
(74) *Attorney, Agent, or Firm* — Birch, Stewart, Kolasch & Birch, LLP

(57) ABSTRACT

A liquid lens according to one embodiment includes a first plate including a cavity in which liquids are disposed, the cavity having an inclined surface, a first electrode disposed on the inclined surface, a second electrode disposed on the first plate, and an insulation layer disposed on the first electrode, wherein the liquids include a conductive liquid and a non-conductive liquid, wherein an interface is formed between the conductive liquid and the non-conductive liquid, wherein the insulation layer includes a base disposed on the first electrode and a plurality of protrusions disposed on the base, and wherein the plurality of protrusions contacts the interface.

19 Claims, 4 Drawing Sheets

(51) Int. Cl.
*G03B 3/10* (2021.01)
*H04N 5/225* (2006.01)
*H04N 5/232* (2006.01)

(58) Field of Classification Search
CPC ............ G02B 2207/115; G02B 27/646; G02B 7/021; G02B 13/0075; G03B 3/10; G09G 3/348; H04N 5/2254; H04N 5/23248; H04N 5/23287
USPC .......................................................... 359/666
See application file for complete search history.

(56) References Cited

U.S. PATENT DOCUMENTS

2016/0187642 A1 6/2016 Karam et al.
2017/0315274 A1* 11/2017 Park ..................... H04N 5/2253

FOREIGN PATENT DOCUMENTS

| | | |
|---|---|---|
| KR | 10-2007-0118847 A | 12/2007 |
| WO | WO 2007/091771 A1 | 8/2007 |
| WO | WO 2008/062067 A1 | 5/2008 |

* cited by examiner

【FIG. 1】
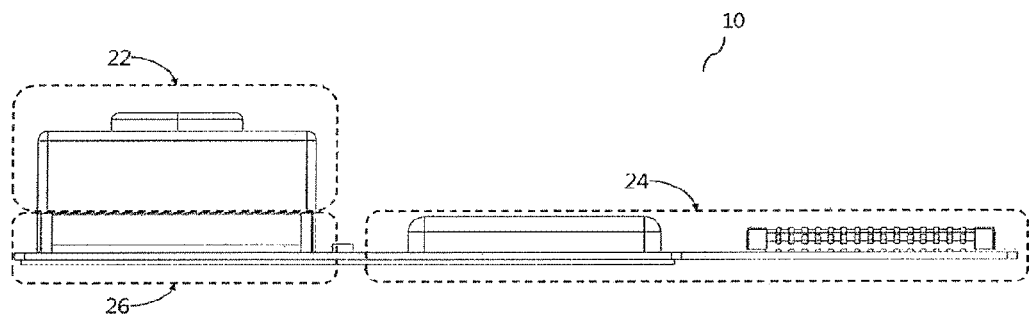
【FIG. 2】
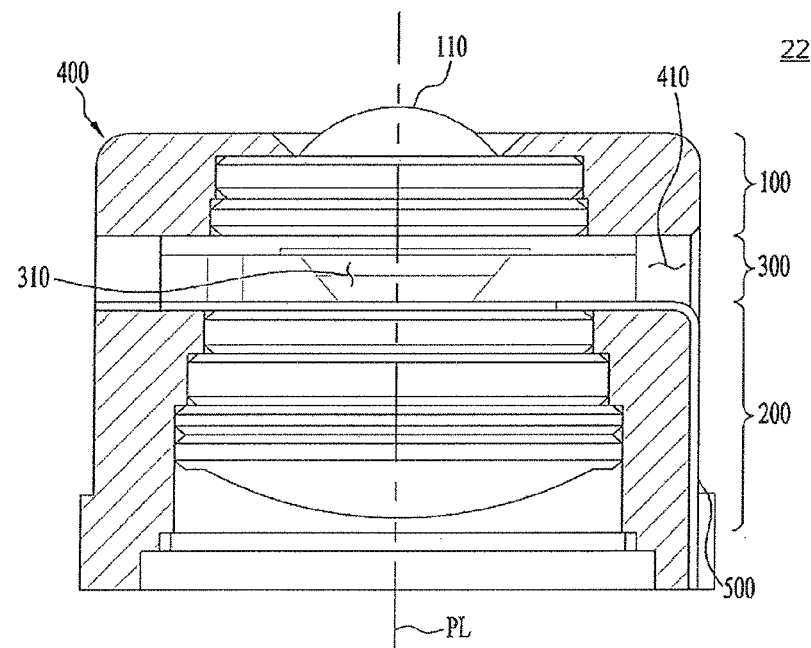

[FIG. 3]
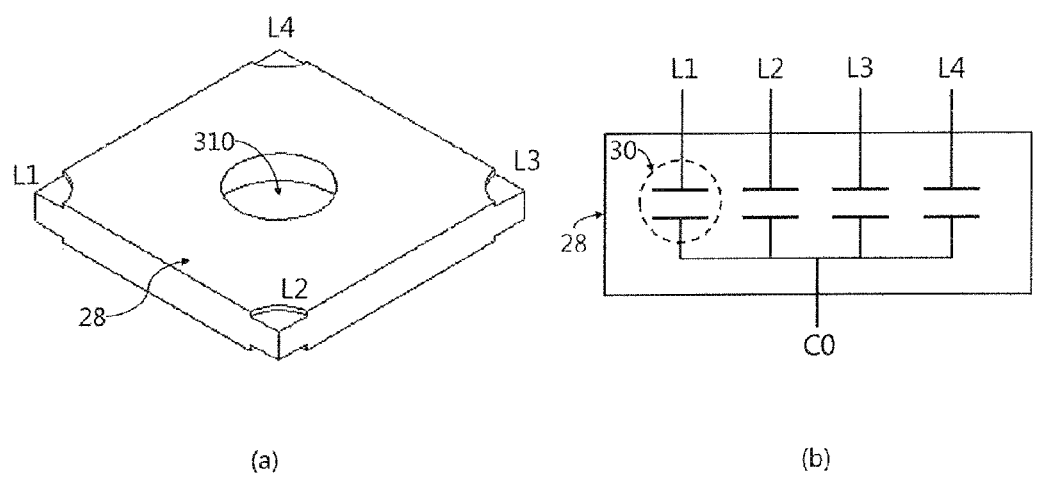
(a)    (b)
[FIG. 4]
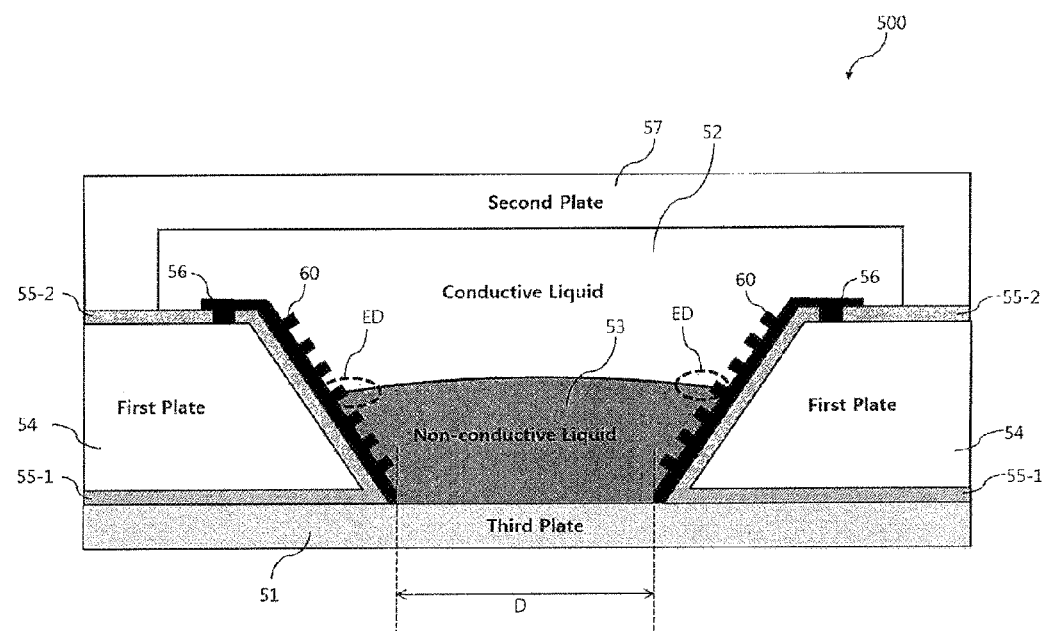

[FIG. 5]
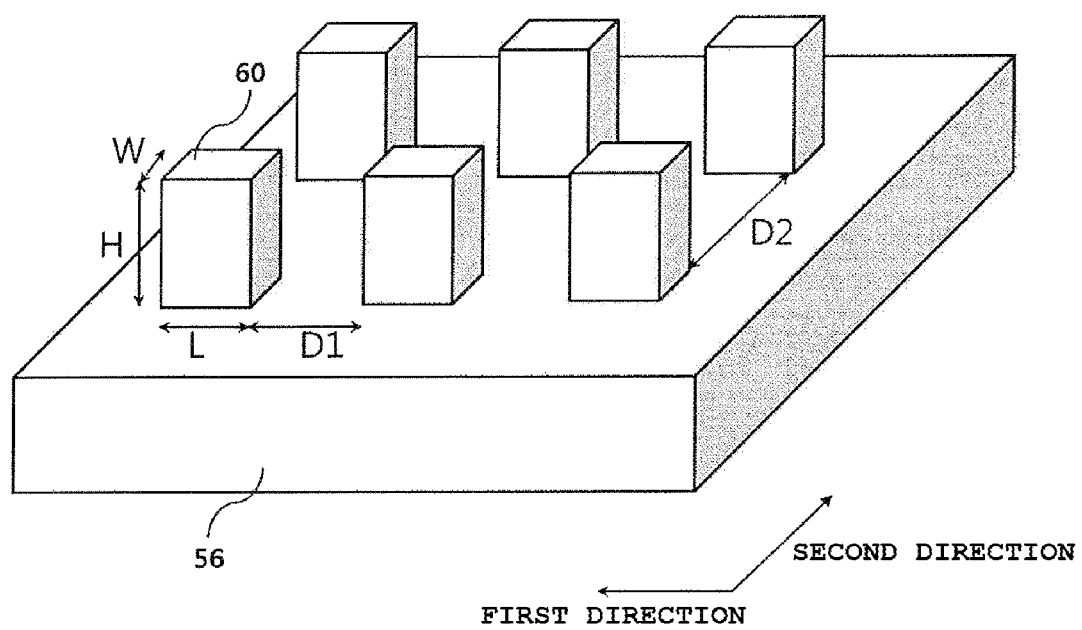
[FIG. 6]
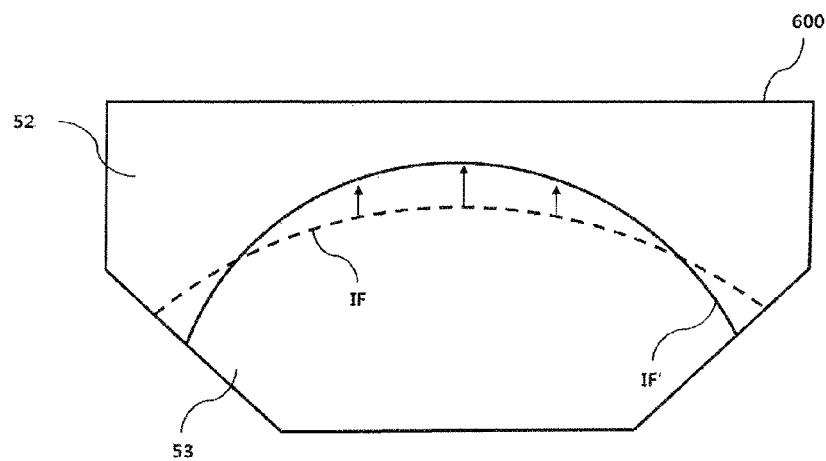

[FIG. 7]
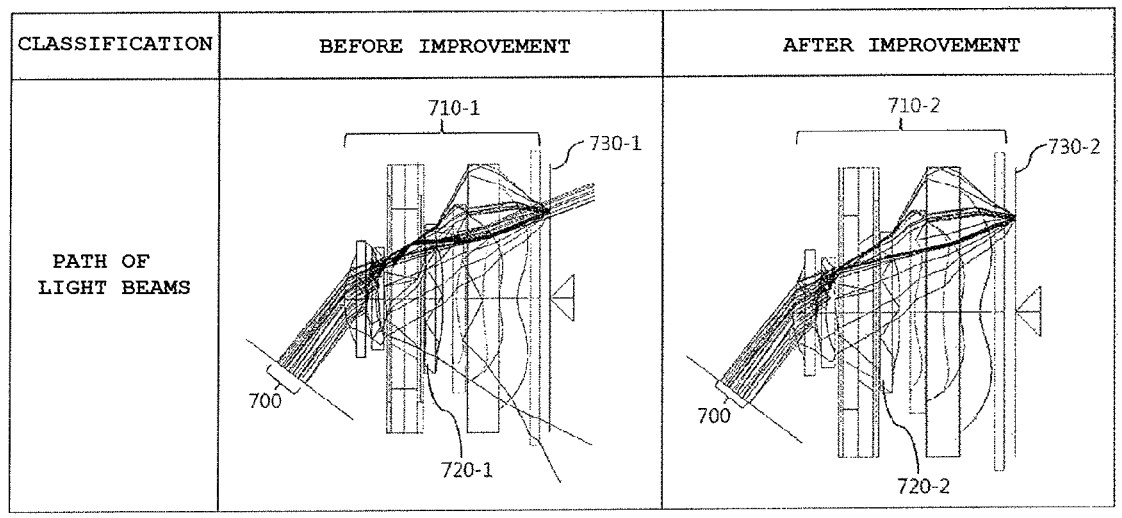
[FIG. 8]
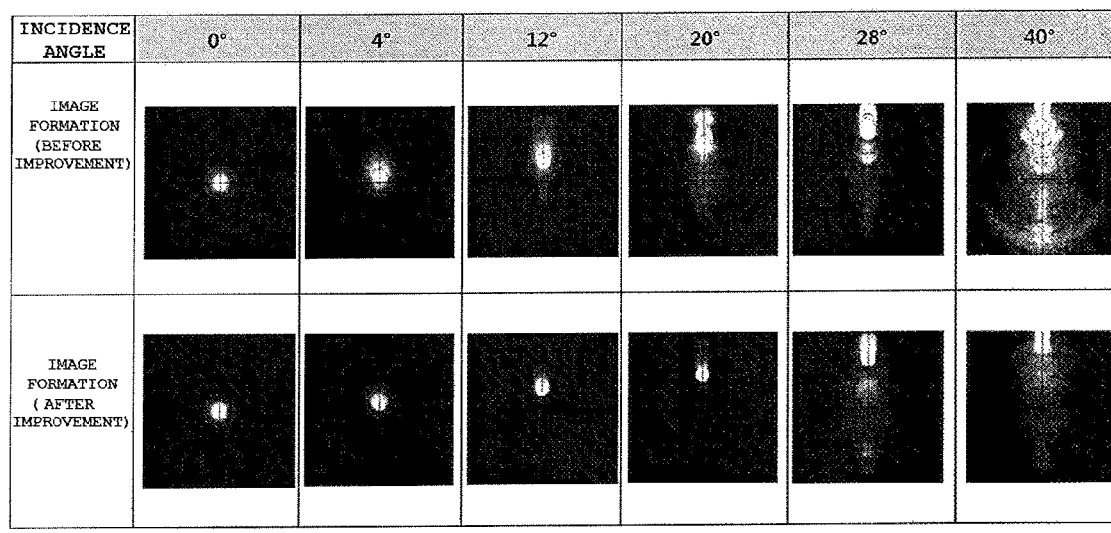

LIQUID LENS, CAMERA MODULE, AND OPTICAL DEVICE

CROSS REFERENCE TO RELATED APPLICATIONS

This application is the National Phase of PCT International Application No. PCT/KR2018/002236, filed on Feb. 23, 2018, which claims priority under 35 U.S.C. 119(a) to Patent Application No. 10-2017-0024717, filed in the Republic of Korea on Feb. 24, 2017, all of which are hereby expressly incorporated by reference into the present application.

TECHNICAL FIELD

Embodiments relate to a lens having a variable focal length (focal distance). More particularly, embodiments relate to a liquid lens enabling adjustment of a focal length using electrical energy, a camera module, and an optical device.

BACKGROUND ART

People who use portable devices demand optical devices that have high resolution, are small, and have various photographing functions (an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased.

The autofocus and hand-tremor compensation functions are performed by tilting or moving a lens module including lenses, the optical axes of which are aligned, along the optical axis or in a direction perpendicular to the optical axis, and an additional lens-moving apparatus is used to move the lens module. However, the lens-moving apparatus consumes a lot of power and requires driving members such as magnets and coils, and an additional cover glass needs to be provided separately from the camera module in order to protect the lens-moving apparatus, thus leading to an increase in the overall thickness of the optical device.

Therefore, research has been conducted on a liquid lens configured to electrically adjust the curvature of an interface between two kinds of liquid in order to perform autofocus and hand-tremor compensation functions.

DISCLOSURE

Technical Problem

Embodiments provide a liquid lens capable of preventing a ghost or flare phenomenon, which deteriorates the characteristics of a lens, and of efficiently realizing focal adjustment, a camera module, and an optical device.

However, the objects to be accomplished by the disclosure are not limited to the above-mentioned objects, and other objects not mentioned herein will be clearly understood by those skilled in the art from the following description.

Technical Solution

In one embodiment, a liquid lens may include a first plate including a cavity in which liquids are disposed, the cavity having an inclined surface, a first electrode disposed on the inclined surface, a second electrode disposed on the first plate, and an insulation layer disposed on the first electrode. The liquids may include a conductive liquid and a non-conductive liquid, an interface may be formed between the conductive liquid and the non-conductive liquid, and the insulation layer may include a base disposed on the first electrode and a plurality of protrusions disposed on the base.

Depending on the embodiment, the plurality of protrusions may be disposed at locations corresponding to the inclined surface, and the interface may move along the inclined surface.

Depending on the embodiment, the plurality of protrusions may include a first protrusion disposed at the uppermost position on the inclined surface and a second protrusion disposed at the lowermost position on the inclined surface, and the interface may move along the insulation layer between the first protrusion and the second protrusion.

Depending on the embodiment, the base and the protrusions may include different materials from each other.

Depending on the embodiment, the plurality of protrusions may be disposed in a first direction and a second direction with respect to the inclined surface, the first direction may be an upward-and-downward direction with respect to the inclined surface, and the second direction may be a leftward-and-rightward direction with respect to the inclined surface.

Depending on the embodiment, the plurality of protrusions may include a first protrusion row including a plurality of protrusions disposed at the uppermost position among a plurality of protrusions disposed in the second direction, and a second protrusion row disposed directly below the first protrusion row. The first protrusion row and the second protrusion row may be disposed in one-to-one correspondence.

Depending on the embodiment, the insulation layer may be disposed so as to be in contact with the first electrode or the second electrode.

Depending on the embodiment, each of the plurality of protrusions may have a length of 5 μm or less, a width of 5 μm or less, and a height of 10 μm or less.

Depending on the embodiment, the distance between two adjacent ones of the protrusions that are disposed in the first direction with respect to the inclined surface may range from 10 μm to 15 μm.

Depending on the embodiment, the insulation layer may include graphite or black resin.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

According to a liquid lens, a camera module, and an optical device according to the embodiments, it is possible to prevent a ghost phenomenon and a flare phenomenon due to reflection of light from the contact area between an interface between liquids having respectively different properties and an inclined surface in an open region.

In addition, it is possible to increase a diopter control range by increasing the contact angle between the interface and the inclined surface.

In addition, it is possible to reduce power consumption for driving the liquid lens by reducing the driving voltage for realizing a specific diopter.

However, the effects achievable through the disclosure are not limited to the above-mentioned effects, and other effects not mentioned herein will be clearly understood by those skilled in the art from the following description.

DESCRIPTION OF DRAWINGS

FIG. 1 illustrates an example of a camera module according to an embodiment.

FIG. 2 illustrates an example of a lens assembly included in the camera module.

FIG. 3 illustrates a lens, the interface of which is adjusted in accordance with a driving voltage.

FIG. 4 is a view illustrating a liquid lens according to an embodiment.

FIG. 5 is a detailed view illustrating a portion of the insulation layer shown in FIG. 4.

FIG. 6 is a view illustrating a change of the interface caused by the protruding portions shown in FIG. 4.

FIG. 7 is a table showing the comparison of paths of light beams passing through an optical system including a liquid lens.

FIG. 8 is a table showing the comparison of images formed by light beams passing through an optical system including a liquid lens at each incidence angle.

BEST MODE

Reference will now be made in detail to the embodiments, examples of which are illustrated in the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

In the following description, elements denoted by the same reference numerals may be construed as having the same structures, functions and materials.

FIG. 1 illustrates an example of a camera module 10 according to an embodiment.

Referring to FIG. 1, the camera module 10 may include a lens assembly 22, which includes a liquid lens and a plurality of lenses, a control circuit 24, and an image sensor 26.

The liquid lens is adjusted in focal length corresponding to a driving voltage applied between a common electrode and each of a plurality of individual electrodes, and the control circuit 24 transmits a signal for supplying the driving voltage to the liquid lens. The image sensor 26 is aligned with the lens assembly 22 and converts the light transmitted through the lens assembly 22 into an electrical signal.

The camera module 10 may include a plurality of circuits 24 and 26, disposed on a single printed circuit board (PCB), and a lens assembly 22, including a plurality of lenses. However, this is merely illustrative, and the embodiment is not limited thereto. The configuration of the control circuit 24 may be designed differently in accordance with the specifications required for an optical device. In particular, in order to reduce the intensity of the operating voltage applied to the lens assembly 22, the control circuit 24 may be implemented as a single chip. As a result, it is possible to further reduce the size of the camera module that is mounted in a portable device.

FIG. 2 illustrates an exemplary cross-sectional view of the lens assembly 22 included in the camera module 10.

Referring to FIG. 2, the lens assembly 22 may include a first lens unit 100, a second lens unit 200, a liquid lens unit 300, a holder 400, and a connection unit 500. The illustrated structure of the lens assembly 22 is just one example, and the structure of the lens assembly 22 may be changed depending on the specifications required for the camera module. For example, in the illustrated example, the liquid lens unit 300 is disposed between the first lens unit 100 and the second lens unit 200. However, in another example, the liquid lens unit 300 may be disposed on the first lens unit 100 (or on the front surface of the first lens unit), and the second lens unit 200 may be omitted.

The first lens unit 100 is disposed at the front side of the lens assembly 22, and receives light from the outside of the lens assembly 22. The first lens unit 100 may include at least one lens, or two or more lenses may be aligned along a center axis PL to form an optical system.

The first lens unit 100 and the second lens unit 200 may be mounted in the holder 400. Here, a through-hole may be formed in the holder 400, and the first lens unit 100 and the second lens unit 200 may be disposed in the through-hole. Further, the liquid lens unit 300 may be inserted into the space between the first lens unit 100 and the second lens unit 200 in the holder 400.

Meanwhile, the first lens unit 100 may include an exposure lens 110. Further, the exposure lens 110 may protrude to the outside of the holder 400. In the case of the exposure lens 110, the lens surface thereof may be damaged due to exposure to the outside. If the lens surface is damaged, the quality of the image captured by the camera module may be deteriorated. In order to prevent or minimize damage to the surface of the exposure lens 110, a method of disposing a cover glass, a method of forming a coating layer, or a method of forming the exposure lens 110 using a wear-resistant material for preventing damage to the surface of the exposure lens 110 may be applied.

The second lens unit 200 may be disposed at the rear of the first lens unit 100 and the liquid lens unit 300, and the light incident on the first lens unit 100 from the outside may pass through the liquid lens unit 300 and may be incident on the second lens unit 200. The second lens unit 200 may be spaced apart from the first lens unit 100, and may be disposed in the through-hole formed in the holder 400.

Meanwhile, the second lens unit 200 may include at least one lens, and when two or more lenses are included, the lenses may be aligned along the center axis PL to form an optical system.

The liquid lens unit 300 may be disposed between the first lens unit 100 and the second lens unit 200, and may be inserted into an insertion hole 410 formed in the holder 400. The liquid lens unit 300 may also be aligned along the center axis PL in the same manner as the first lens unit 100 and the second lens unit 200.

The liquid lens unit 300 may include a lens region 310. The lens region 310 may be a region that light that has passed through the first lens unit 100 penetrates, and may include a liquid in at least a portion thereof. For example, two kinds of liquid, i.e. a conductive liquid and a non-conductive liquid, may be included in the lens region 310, and the conductive liquid and the non-conductive liquid may form an interface therebetween without being mixed with each other. The interface between the conductive liquid and the non-conductive liquid may be deformed by a driving voltage applied thereto through the connection unit 500, whereby the curvature and/or the focal length of the liquid lens unit 300 may be changed. When the deformation of the interface and the change in the curvature thereof are controlled, the liquid lens unit 300, the lens assembly 22 including the same, and the camera module 10 may perform an autofocus (AF) function, a hand-tremor compensation or optical image stabilization (OIS) function, etc.

FIG. 3 illustrates a lens, the interface of which is adjusted in accordance with a driving voltage. Specifically. (a) illustrates a liquid lens 28 included in the liquid lens unit 300, which is included in the lens assembly 22 (shown in FIG. 2), and (b) illustrates an equivalent circuit of the liquid lens 28.

First, referring to (a), the liquid lens 28, the interface of which is adjusted corresponding to a driving voltage, may receive driving voltages via a plurality of individual electrodes L1, L2, L3 and L4. The individual electrodes may be disposed at the same angular intervals from each other in respectively different directions. When driving voltages are applied to the liquid lens via the individual electrodes L1, L2, L3 and L4, the interface between the conductive liquid and the non-conductive liquid disposed in the lens region 310 may be deformed by the voltage applied to the common electrode, which will be described later. The degree and type of deformation of the interface between the conductive liquid and the non-conductive liquid may be controlled by the control circuit 24 in order to realize an AF function or an OIS function.

Further, referring to (b), the lens 28 may be defined as a plurality of capacitors 30, one side of each of which receives a driving voltage from a corresponding one of the individual electrodes L1, L2, L3 and L4, and the other side of which is connected to the common electrode CO.

Although an embodiment in which four individual electrodes are provided is described by way of example in this specification, the scope of the embodiment is not limited thereto.

FIG. 4 is a view illustrating a liquid lens according to an embodiment. FIG. 5 is a detailed view illustrating a portion of the insulation layer shown in FIG. 4.

Referring to FIG. 4, the cross-section of the liquid lens 500 corresponds to one embodiment of the cross-section of the liquid lens 28 shown in FIG. 3.

The liquid lens 500 may include a conductive liquid 52, a non-conductive liquid 53, a plate, an electrode unit, and an insulation layer 56. The plate may include a first plate 54, and may further include a second plate 57 and a third plate 51. The electrode unit may include a first electrode 55-1 and a second electrode 55-2.

The third plate 51 may be made of a transparent

The third plate 51 may be made of a transparent material, and may be the first part of the liquid lens 500 that receives the light that has passed through the first lens unit 100 (refer to FIG. 2). Although the present disclosure is described on the assumption that the liquid lens 500 is the liquid lens 28 of the liquid lens unit 300 which is included in the lens assembly 22 shown in FIG. 2, the liquid lens 500 may be mounted in the lens assembly such that the third plate 51 is the last part of the liquid lens 500 that receives light. The third plate 51 may be disposed under the first electrode 55-1, and the second plate 57 may be disposed on the second electrode 55-2.

The conductive liquid 52 and the non-conductive liquid 53 may be charged in a cavity defined by an open region in the first plate 54. That is, the cavity may be filled with the conductive liquid 52 and the non-conductive liquid 53, which have different properties from each other, and an interface may be formed between the conductive liquid 52 and the non-conductive liquid 53, which have different properties from each other.

As the curvature or inclination of the interface formed between the conductive liquid 52 and the non-conductive liquid 53 changes, the focal length or the shape of the liquid lens 500 may be adjusted. The region in which an optical signal passes through the interface may correspond to the lens region 310 described with reference to FIG. 3.

Here, the conductive liquid 52 may include at least one of ethylene glycol or sodium bromide (NaBr), or may be formed of a mixture of ethylene glycol and sodium bromide (NaBr). The non-conductive liquid 53 may include a phenyl-based silicon oil.

The first plate 54 may be disposed between the third plate 51 and the second plate 57, and may include an open region having a predetermined inclined surface (e.g. an inclined surface having an angle of about 59° to 61°). That is, the first plate 54 may include an inclined surface therein, and the conductive liquid 52 and the non-conductive liquid 53 may be disposed to contact the inclined surface. The first plate 54 may be a housing structure in the liquid lens 500 in which two kinds of liquid having different properties from each other are accommodated. The third plate 51 and the second plate 57 may include a region through which an optical signal passes, and thus may be formed of a material having high transparency, such as glass. For convenience of processing, specifically because it is easy to prevent the liquid charged in the cavity from flowing out when an intermediate layer formed of the same material is used for bonding, the first plate 54 may also be formed of a material such as glass. According to another embodiment, the first plate 54 may include impurities so that an optical signal does not easily pass therethrough.

The first electrode 55-1 and the second electrode 55-2 may function to apply an electrical signal received from the control circuit 24 (refer to FIG. 1) for controlling the interface formed between the conductive liquid 52 and the non-conductive liquid 53. The first electrode 55-1 may be disposed on the inclined surface of the first plate 54, and the second electrode 55-2 may be disposed on the first plate 54.

As described with reference to FIG. 3, electrodes and/or electrode patterns for forming the individual electrodes L1, L2, L3 and L4 and the common electrode CO may be included in both sides of the first plate 54, which are adjacent to the third plate 51 and the second plate 57. The second electrode 55-2 may be a common electrode, which is disposed so as to be in contact with the conductive liquid 52, and the first electrode 55-1 may be an individual electrode, which is disposed adjacent to the conductive liquid 52, with the insulation layer 56 interposed therebetween.

Here, the first electrode 55-1 and the second electrode 55-2 may include chrome (Cr). Chromium or chrome is a glossy silver rigid transition metal, which is not fragile, does not readily discolor, and has a high melting point. However, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid in the cavity.

The insulation layer 56 is configured to physically insulate the first electrode 55-1 from the conductive liquid 52 and the non-conductive liquid 53. For example, the insulation layer 56 may include parylene C, and may be formed through a method such as coating, deposition, or plating.

The insulation layer 56 may be disposed on the inclined surface that may contact the conductive liquid 52 and the non-conductive liquid 53, and may extend so as to be disposed on the first plate 54 and under the non-conductive liquid 53. The insulation layer 56 may extend from the inclined surface so as to be disposed between the third plate 51 and the liquid. For example, the insulation layer 56 may be disposed on the upper surface of the third plate 51. The insulation layer 56 may be disposed so as to prevent the inclined surface and the first electrode 55-1, which extends from the inclined surface so as to be disposed on the first plate 54, from contacting the liquid. The insulation layer 56 may extend so as to be disposed between the first electrode 55-1, which extends so as to be disposed on the first plate 54, and the second electrode 55-2, which is disposed on the first plate. The insulation layer 56 may be disposed on the first electrode 55-1. The insulation layer 56 may be disposed on the first plate 54, on which the first electrode 55-1 and the second electrode 55-2 are disposed adjacent to each other, so as to cover the first electrode 55-1 in order to prevent the first electrode 55-1 from contacting the conductive liquid 52. As shown in FIG. 4, the insulation layer may be disposed so as to allow at least a portion of the conductive liquid 52 to contact the second electrode 55-2, but the scope of the embodiment is not limited thereto.

The insulation layer 56 may include a protruding portion 60 formed on at least a portion of the inclined surface that may contact the conductive liquid 52 and the non-conductive liquid 53. The protruding portion 60 may be referred to as a protrusion. The insulation layer 56 may be disposed on the upper surface of the first electrode 55-1, and the insulation layer 56 may include a base disposed on the upper surface of the first electrode 55-1. In addition, the insulation layer 56 may include a plurality of protrusions 60 protruding from the base. The protrusions 60 may be disposed on the inclined surface of the side wall of the cavity. The protrusions 60 may be disposed on the electrode and the base, which are disposed on the inclined surface of the side wall of the cavity. The interface formed between the conductive liquid 52 and the non-conductive liquid 53 may move along the inclined surface of the cavity. The outer peripheral end of the interface formed between the conductive liquid 52 and the non-conductive liquid 53 may move along the inclined surface. The protrusions 60 may include a first protrusion disposed at the uppermost position on the inclined surface and a second protrusion disposed at the lowermost position on the inclined surface. The interface formed between the conductive liquid 52 and the non-conductive liquid 53 may move along the insulation layer 56 between the first protrusion and the second protrusion. At least one of the first protrusion or the second protrusion may be provided in a plural number.

The material of the base and the material of the protrusions 60 may be different from each other.

A portion of the inclined surface of the insulation layer 56 is shown in FIG. 5. The insulation layer 56 may include protruding portions 60, and the protruding portions 60 may be implemented as a plurality of protrusions protruding from the inclined surface of the insulation layer 56. The plurality of protrusions may contact the interface formed between the conductive liquid 52 and the non-conductive liquid 53.

The plurality of protrusions may be disposed in a lattice form in a first direction and a second direction with respect to the inclined surface, but the scope of the embodiment is not limited thereto. The first direction may be the upward-and-downward direction with respect to the inclined surface of the insulation layer 56, and the second direction may be the leftward-and-rightward direction with respect to the inclined surface of the insulation layer 56.

For example, each protrusion may have a length L of about 5 μm or less, a width W of about 5 μm or less, and a height H of about 10 μm or less. A first distance D1 between two adjacent ones of the protrusions that are disposed in the first direction may range from about 10 μm to 15 μm. A second distance D2 between two adjacent ones of the protrusions that are disposed in the second direction may range from about 10 μm to 15 μm. If the protrusions are disposed out of the above ranges, even when the same intensity of voltage is applied, the angle formed between the liquid and the electrode or between the liquid and the inclined surface may be reduced.

For example, the base of the insulation layer 56 may have a thickness of about 0.5 μm to 15 μm or about 1 μm to 10 μm. In addition, the sum of the thickness of the base and the height of each protrusion may range from 3 μm to 15 μm. The height of each protrusion 60 may be 1.5 to 20 times the thickness of the base. On the assumption that the same intensity of voltage is applied, as the thickness of the insulation layer 56 decreases, the angle between the liquid and the surface on which the electrode is disposed may increase, and thus efficiency may be improved. However, when it is desired to form an extremely thin base, it may be difficult to perform base coating with a uniform thickness and roughness due to the characteristics of insulation coating.

The heights, sizes, or widths of the protrusions 60 may not be uniform. For example, the heights, sizes, or widths of the protrusions may change with a uniform tendency as the protrusions are disposed at higher positions on the inclined surface, or may be formed in a random manner without a uniform tendency. For example, the heights, sizes, or widths of the protrusions may gradually increase or decrease as the protrusions are disposed at higher positions on the inclined surface. Alternatively, the protrusions may be formed in a random manner. The plurality of protrusions may include a first protrusion row, which includes a plurality of protrusions disposed at the uppermost position among a plurality of protrusions disposed in the second direction, and a second protrusion row, which is disposed directly below the first protrusion row. The first protrusion row and the second protrusion row may be disposed in one-to-one correspondence.

In FIG. 5, the protrusions are illustrated as having the same shape and size as each other. However, depending on the embodiment, the protrusions may have different shapes or different sizes from each other. Each protrusion may have a rectangular parallelepiped shape or any of various polyhedral shapes, such as a cubic shape, a cylindrical shape, and a truncated quadrangular pyramid shape.

According to another embodiment, the first distance D1 and the second distance D2 may be different from each other, or the plurality of protrusions may not be disposed at the uniform first distance D1 and second distance D2, but may be irregularly disposed.

The insulation layer 56, which includes the protruding portions 60, may include parylene C, and may be formed through a method such as coating, deposition, or plating, and the protruding portions 60 may be formed on the insulation layer through etching.

According to another embodiment, the insulation layer 56, which includes the protruding portions 60, may be formed in a film shape and may be bonded onto the first plate 54 and the electrode unit.

The protruding portions 60 may be disposed so as to contact the edge ED of the interface that is adjacent to the insulation layer 56. That is, the insulation layer 56, which includes the protruding portions 60, may be disposed so as to contact the edge of the interface IF on the outermost portion of the inclined surface in the open region. Thereby, the interface formed between the conductive liquid 52 and the non-conductive liquid 53 may move along the protruding portions 60.

The insulation layer 56, which includes the protruding portions 60, may be disposed so as not to overlap an open surface D, which is formed under the non-conductive liquid 53 to allow light to pass therethrough. The reason for this is to prevent the field of view (FOV) of the liquid lens 500 from being affected by the insulation layer 56. According to another embodiment, the insulation layer 56 may be disposed so as to overlap the open surface D in order to simplify processing. At this time, the insulation layer 56 may include a light-transmissive material.

The insulation layer 56 may include a material that does not reflect light (e.g. a material coated with graphite or a soma film) or a material that has low light reflectance (e.g. black resin).

The second plate 57 may be formed of a transparent material such as glass, and may define the cavity together with the third plate 51 and the open region, into which the conductive liquid 52 and the non-conductive liquid 53 are charged.

FIG. 6 is a view illustrating a change of the interface caused by the protruding portions shown in FIG. 4.

In FIG. 6, a cavity 600 of the liquid lens 500, which is filled with the conductive liquid 52 and the non-conductive liquid 53, is schematically illustrated.

If the insulation layer 56 does not include the protruding portions 60 on the inclined surface thereof, the conductive liquid 52 and the non-conductive liquid 53 may form an interface IF therebetween at a specific driving voltage (e.g. 30 V).

However, since the insulation layer 56 according to the embodiment includes the protruding portions 60, the conductive liquid 52 and the non-conductive liquid 53 may form an interface IF' therebetween at the same driving voltage (e.g. 30 V).

The surface tension of the insulation layer 56 may be increased due to the uneven structure of the protruding portions 60, and thus the contact angle between the interface and the inclined surface may be increased at the same driving voltage, thereby increasing the curvature of the interface IF'.

That is, since the curvature of the interface is proportional to the diopter or the refractive index for adjusting the focal length, the range of the diopter that is capable of being controlled may be increased. In addition, since the driving voltage required to realize the same diopter may be reduced, power consumption for controlling the liquid lens 500 may be reduced.

FIG. 7 is a table showing the comparison of paths of light beams passing through an optical system including a liquid lens between a comparative example and the embodiment. FIG. 8 is a table showing the comparison of images formed by light beams passing through an optical system including a liquid lens at each incidence angle.

FIG. 7 shows paths along which light beams 700 having a specific angle of incidence pass through an optical system 710-1 and 710-2 including a liquid lens 720-1 and reach the light-receiving surface of an image sensor 26 (i.e. the front surface of a pixel array 730-1 and 730-2).

The left drawing corresponds to a structure before the improvement, i.e. the comparative example in which the insulation layer of the liquid lens 720-1 does not include protruding portions. The right drawing corresponds to a structure after the improvement, i.e. the embodiment in which the insulation layer 56 of the liquid lens 720-1 includes the protruding portions 60.

A comparison between the states before and after the improvement will be described. Before the improvement, the light beams 700 are refracted and dispersed in various paths while passing through the liquid lens 720-1. When the dispersed light beams pass through an optical system following the liquid lens 720-1 and reach the light-receiving surface 730-1, the light beams are not condensed in a specific region but are dispersed.

In contrast, after the improvement, the light beams 700 are not dispersed while passing through the liquid lens 720-2 but are transmitted to an optical system following the liquid lens 720-1. Upon reaching the light-receiving surface 730-2, the light beams may be condensed in a specific region.

Light reflection may occur at the edge ED of the interface between the conductive liquid 52 and the non-conductive liquid 53, which contacts the inclined surface of the insulation layer. A ghost phenomenon or a flare phenomenon may occur in an image generated by the image sensor 26 due to the light dispersed by the light reflection in the structure before the improvement.

A ghost phenomenon is a phenomenon in which, when strong light is directly incident on a lens and is reflected from a lens barrel, an afterimage remains and is superimposed on a captured image. The afterimage is formed in accordance with the circumferential shape of an aperture.

A flare phenomenon is a phenomenon in which a captured image looks blurry due to reflection of light incident on a lens from a lens barrel or diffuse reflection caused by a very bright subject.

The ghost phenomenon and the flare phenomenon may greatly deteriorate the quality of the image captured through the lens assembly 22, and may be mainly caused by the reflection of light from a lens barrel, and particularly may occur at the inclined surface of the liquid lens.

However, in the structure after the improvement, it can be seen that light reflection at the edge ED of the interface of the liquid lens 720-2 is greatly reduced. This is because the uneven structure or the nanostructure of the insulation layer 56 including the protruding portions 60 causes light to be reflected at irregular angles. A ghost or flare phenomenon occurs because a certain amount of light is reflected at a regular angle from the inclined surface and is condensed in a specific region. However, in the structure after the improvement, the liquid lens 720-2 realizes irregular light reflection, whereby light may be dispersed without being condensed, and may be reflected in the direction in which the light is incident so as not to be transmitted to the image sensor 26. As a result, a ghost or flare phenomenon may be greatly reduced.

FIG. 8 shows a comparison of the shapes of light beams that have passed through an optical system including a liquid lens at each incidence angle and reach the light-receiving surface.

The light-receiving surface that light beams reach and form an image thereon may appear blue, and the amount of light beams that reach the light-receiving surface may be characterized by a color temperature. That is, an area that a relatively large amount of light beams reaches may have a white color temperature, and an area that a relatively small amount of light beams reaches may have a red color temperature.

Ideally, as the incidence angle increases, a ghost or flare phenomenon may not occur when an area on which light is condensed moves upwards from the center by a distance proportional to the incidence angle.

A comparison between the states before and after the improvement when the incidence angle is 0° will be described. It can be seen that light is condensed on the center of the light-receiving surface both before and after the improvement. This is because, when the incidence angle is 0°, light is incident along the optical axis of the optical system and thus is hardly reflected from the inclined surface in the open region.

A comparison between the states before and after the improvement when the incidence angle is 4° and 12° will be described. It can be seen that the area on which light is condensed moves upwards from the center of the light-receiving surface both before and after the improvement, but the area on which light is condensed spreads slightly in the image formation before the improvement. This is because, when the incidence angle exceeds 0°, light is incident at a certain angle, rather than along the optical axis of the optical system, and is increasingly reflected from the inclined surface in the open region.

A comparison of image formation between before and after the improvement when the incidence angle is 20°, 28°, and 40° will be described. Before the improvement, it can be seen that light is not condensed on a specific area but is dispersed to the periphery. This is because, when the incidence angle increases, light is incident at a greater incidence angle with respect to the optical axis of the optical system, and thus a larger amount of light is reflected from the inclined surface in the open region. The light refracted by this reflection may cause a ghost phenomenon and a flare phenomenon.

In contrast, after the improvement, it can be seen that a relatively large amount of light is condensed on a specific area and that the amount of light that is dispersed to the periphery is reduced. As a result, it is possible to greatly reduce a ghost phenomenon and a flare phenomenon compared to before the improvement.

Hereinafter, the configuration of a camera module according to an embodiment will be described.

The camera module may include a lens assembly including a liquid lens, an infrared cutoff filter (not shown), a printed circuit board (not shown), an image sensor (not shown), and a controller (not shown). However, any one or more of the infrared cutoff filter and the controller may be omitted from or modified in the camera module.

The infrared filter may prevent infrared light from being incident on the image sensor. The infrared filter may be disposed between the lens assembly and the image sensor. The infrared filter may be an infrared absorption filter or an infrared reflection filter. Alternatively, the infrared filter may not be separately disposed, but may be coated or deposited on any one surface of the liquid lens.

The upper surface of the printed circuit board and the liquid lens may be electrically connected to each other. The image sensor may be disposed on the printed circuit board. The printed circuit board may be electrically connected to the image sensor. In one example, a holder member may be disposed between the printed circuit board and the lens assembly. Here, the holder member may accommodate the image sensor therein. The printed circuit board may supply power (current or voltage) to the liquid lens. Meanwhile, the controller for controlling the liquid lens may be disposed on the printed circuit board.

Hereinafter, the configuration of an optical device according to an embodiment will be described.

The optical device may be any one of a mobile phone, a smartphone, a portable smart device, a digital camera, a laptop computer, a digital broadcasting terminal, a personal digital assistant (PDA), a portable multimedia player (PMP), and a navigator. However, the optical device is not limited thereto, but may include any device capable of capturing an image or a picture.

The optical device may include a main body (not shown), a camera module, and a display unit (not shown). However, any one or more of the main body, the camera module, and the display unit may be omitted from or modified in the optical device.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed to limit the disclosure in all aspects and to be considered by way of example. The scope of the disclosure should be determined by reasonable interpretation of the accompanying claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens, a camera module, and an optical device according to the embodiments may be used in camera/video devices, telescopic devices, microscopic devices, an interferometer, a photometer, a polarimeter, a spectrometer, a reflectometer, an auto-collimator, a lens-meter, a smartphone, a laptop computer, and a tablet computer.

The invention claimed is:

1. A liquid lens, comprising:
   a first plate comprising a cavity in which liquids are disposed, the cavity having an inclined surface;
   a first electrode disposed on the inclined surface;
   a second electrode disposed on the first plate; and
   an inclined insulation layer disposed on the first electrode,
   wherein the liquids comprise a conductive liquid and a non-conductive liquid,
   wherein an interface is formed between the conductive liquid and the non-conductive liquid,
   wherein the inclined insulation layer comprises an inclined base disposed on the first electrode and a plurality of protrusions disposed on the inclined base,
   wherein the plurality of protrusions contacts the interface,
   wherein the plurality of protrusions of the inclined insulation layer is disposed so as not to overlap in a direction parallel to an optical direction an open surface, which is formed under the non-conductive liquid to allow light to pass therethrough and which contacts the inclined surface, and
   wherein a size of the open surface in a direction perpendicular to the optical direction is smaller than a distance by which the protrusions facing each other in the direction perpendicular to the optical direction are most closest spaced apart from each other in the direction perpendicular to the optical direction.

2. The liquid lens according to claim 1, wherein the plurality of protrusions is disposed at locations corresponding to the inclined surface, and
   wherein the interface moves along the inclined surface.

3. The liquid lens according to claim 1, wherein the plurality of protrusions comprises a first protrusion disposed at an uppermost position on the inclined surface and a second protrusion disposed at a lowermost position on the inclined surface, and
   wherein the interface moves along the inclined insulation layer between the first protrusion and the second protrusion.

4. The liquid lens according to claim 1, wherein the inclined base and the protrusions comprise different materials from each other.

5. The liquid lens according to claim 1, wherein the plurality of protrusions is disposed in a first direction and a second direction with respect to the inclined surface,
   wherein the first direction is an upward-and-downward direction with respect to the inclined surface, and
   wherein the second direction is a leftward-and-rightward direction with respect to the inclined surface.

6. The liquid lens according to claim 5, wherein the plurality of protrusions comprises:
   a first protrusion row comprising a plurality of protrusions disposed at an uppermost position among a plurality of protrusions disposed in the second direction; and
   a second protrusion row disposed directly below the first protrusion row, and wherein the first protrusion row and the second protrusion row are disposed in one-to-one correspondence.

7. The liquid lens according to claim 5, wherein the plurality of protrusions is disposed in a lattice form in the first direction and the second direction.

8. The liquid lens according to claim 5, wherein a first distance between two adjacent ones of the protrusions that are disposed in the first direction is different from a second distance between two adjacent ones of the protrusions that are disposed in the second direction.

9. The liquid lens according to claim 1, wherein the inclined insulation layer is disposed so as to be in contact with the first electrode or the second electrode.

10. The liquid lens according to claim 1, wherein each of the plurality of protrusions has a length of 5μm or less, a width of 5μm or less, and a height of 10 μm or less.

11. The liquid lens according to claim 1, wherein a distance between two adjacent ones of the protrusions that are disposed in a first direction ranges from 10 μm to 15 μm, and
    wherein the first direction is an upward-and-downward direction with respect to the inclined surface.

12. The liquid lens according to claim 1, wherein the inclined insulation layer comprises graphite or black resin.

13. The liquid lens according to claim 1, wherein a distance between two adjacent ones of the protrusions that are disposed in a second direction ranges from 10 μm to 15 μm, and
    wherein the second direction is a leftward-and-rightward direction with respect to the inclined surface.

14. The liquid lens according to claim 1, wherein a height of each of the protrusions is 1.5 to 20 times a thickness of the inclined base.

15. The liquid lens according to claim 1, wherein the first plate includes an upper surface, a lower surface and the inclined surface extending between the upper surface and the lower surface, and
    wherein heights, sizes, or widths of the protrusions gradually increase as the protrusions are disposed closer to the upper surface than the lower surface on the inclined surface.

16. The liquid lens according to claim 1, wherein the first plate includes an upper surface, a lower surface and the inclined surface extending between the upper surface and the lower surface, and
    wherein heights, sizes, or widths of the protrusions gradually decrease as the protrusions are disposed closer to the upper surface than the lower surface on the inclined surface.

17. The liquid lens according to claim 1, comprising:
    a second plate disposed on the second electrode; and
    a third plate disposed under the first electrode.

18. A camera module, comprising:
    a lens assembly including the liquid lens according to claim 1;
    a control circuit supplying a driving voltage to the liquid lens; and
    an image sensor aligned with the lens assembly and converting light transmitted through the lens assembly into an electrical signal.

19. An optical device comprising the camera module according to claim 18.

* * * * *